United States Patent
Ko et al.

(10) Patent No.: US 9,894,708 B2
(45) Date of Patent: Feb. 13, 2018

(54) COORDINATION OF WI-FI P2P AND LTE DATA TRAFFIC

(71) Applicant: MEDIATEK INC., Hsinchu (TW)

(72) Inventors: Li-Chun Ko, Taipei (TW); Chia-Hsiang Hsu, Kaohsiung (TW); Ho-Chun Chiang, Hsinchu County (TW); Kun-Hsing Chou, Hsinchu County (TW); Shu-Hsun Wu, Hsinchu County (TW); Kai-Hsiang Hsieh, Hsinchu County (TW)

(73) Assignee: MEDIATEK INC., Hsin-Chu (TW)

(*) Notice: Subject to any disclaimer, the term of this patent is extended or adjusted under 35 U.S.C. 154(b) by 108 days.

(21) Appl. No.: 15/133,355

(22) Filed: Apr. 20, 2016

(65) Prior Publication Data

US 2016/0316488 A1    Oct. 27, 2016

Related U.S. Application Data

(60) Provisional application No. 62/150,635, filed on Apr. 21, 2015.

(51) Int. Cl.
*H04W 80/04* (2009.01)
*H04W 84/12* (2009.01)
(Continued)

(52) U.S. Cl.
CPC ..... *H04W 76/048* (2013.01); *H04W 52/0216* (2013.01); *H04W 72/1215* (2013.01); *H04W 76/026* (2013.01); *Y02B 60/50* (2013.01)

(58) Field of Classification Search
CPC ..... H04W 80/04; H04W 72/12; H04W 76/04; H04W 72/1284; H04W 76/048; H04W 84/12
See application file for complete search history.

(56) References Cited

U.S. PATENT DOCUMENTS

2011/0188391 A1* 8/2011 Sella ............ H04W 24/10
                                            370/252
2012/0040715 A1   2/2012 Fu et al. ............. 455/553.1
(Continued)

FOREIGN PATENT DOCUMENTS

CN    102484805 A    5/2012
CN    103168487 A    6/2013
(Continued)

OTHER PUBLICATIONS

International Search Report and Written Opinion of International Search Authority for PCT/CN2016/079833 dated Jul. 13, 2016 (11 pages).

*Primary Examiner* — Andrew Lee
(74) *Attorney, Agent, or Firm* — Imperium Patent Works; Zheng Jin (57) ABSTRACT

For LTE cellular data and Wi-Fi P2P technology coexistence scenario, a user equipment can generate in-device coexistence (IDC) indication message to the base station for DRX-based IDC solution. LTE data scheduling is described by a set of DRX parameters, while Wi-Fi P2P data scheduling is described by Opportunistic Power Saving (OppoPS) and Notification of Absence (NoA) parameters. When generating the IDC indication message for Wi-Fi P2P group client (GC), the DRX parameters must be selected carefully to maximize efficiency. Even though Wi-Fi shares less time, with proper time alignment, its coexistence performance could be better. For Wi-Fi P2P group owner (GO) with IDC TDM scheduling constraints, OppoPS and NoA should be aligned with DRX parameters to achieve best performance.

22 Claims, 12 Drawing Sheets

(51) Int. Cl.
    *H04W 76/04*     (2009.01)
    *H04W 52/02*     (2009.01)
    *H04W 72/12*     (2009.01)
    *H04W 76/02*     (2009.01)

(56) References Cited

U.S. PATENT DOCUMENTS

| | | | |
|---|---|---|---|
| 2012/0069766 A1* | 3/2012 | Fu | H04B 1/406 370/252 |
| 2012/0082140 A1* | 4/2012 | Lin | H04W 72/1215 370/336 |
| 2013/0176891 A1 | 7/2013 | Lee et al. | 370/252 |
| 2014/0036745 A1* | 2/2014 | Koo | H04W 16/14 370/311 |
| 2014/0036821 A1* | 2/2014 | Mcnamara | H04L 5/0007 370/329 |
| 2014/0092761 A1* | 4/2014 | Behravan | H04W 24/02 370/252 |
| 2014/0141825 A1* | 5/2014 | Koo | H04W 48/08 455/501 |
| 2014/0269534 A1 | 9/2014 | Persson et al. | 370/329 |
| 2015/0296526 A1* | 10/2015 | Behravan | H04W 16/14 370/329 |

FOREIGN PATENT DOCUMENTS

| | | |
|---|---|---|
| CN | 103384158 A | 11/2013 |
| CN | 104053170 A | 9/2014 |
| DE | 102013104564 A1 | 11/2013 |

\* cited by examiner

DRX-BASED IDC SOLUTION
FIG. 3

Wi-Fi P2P TECHNOLOGY
FIG. 4

OPPORTUNISTIC POWER SAVING

FIG. 5

NOTIFICATION OF ABSENCE

FIG. 6

GC + OPPORTUNISTIC POWER SAVING

FIG. 7

GC + OPPORTUNISTIC POWER SAVING

FIG. 8

GC + NOTIFICATION OF ABSENCE

FIG. 9

GC + NOTIFICATION OF ABSENCE

FLOW CHART FOR GC

FLOW CHART FOR GO

COORDINATION OF WI-FI P2P AND LTE DATA TRAFFIC

CROSS REFERENCE TO RELATED APPLICATIONS

This application claims priority under 35 U.S.C. § 119 from U.S. Provisional Application No. 62/150,635, entitled "Coordination of Wi-Fi P2P and LTE data traffic," filed on Apr. 21, 2015, the subject matter of which is incorporated by reference.

TECHNICAL FIELD

The disclosed embodiments relate generally to wireless network communications, and, more particularly, to coordination of Wi-Fi P2P and LTE data traffic for better performance and more power saving.

BACKGROUND

Ubiquitous network access has been almost realized today. From network infrastructure point of view, different networks belong to different layers (e.g., distribution layer, cellular layer, hot spot layer, personal network layer, and fixed/wired layer) that provide different levels of coverage and connectivity to users. Because the coverage of a specific network may not be available everywhere, and because different networks may be optimized for different services, it is thus desirable that user devices support multiple radio access networks on the same device platform. As the demand for wireless communication continues to increase, wireless communication devices such as cellular telephones, personal digital assistants (PDAs), smart handheld devices, laptop computers, tablet computers, etc., are increasingly being equipped with multiple radio transceivers. A multiple radio terminal (MRT) may simultaneously include a Long-Term Evolution (LTE) or LTE-Advanced (LTE-A) radio, a Wireless Local Area Network (WLAN, e.g., WiFi) access radio, a Bluetooth (BT) radio, and a Global Navigation Satellite System (GNSS) radio.

Due to scarce radio spectrum resource, different technologies may operate in overlapping or adjacent radio spectrums. For example, LTE/LTE-A TDD mode often operates at 2.3-2.4 GHz, WiFi often operates at 2.400-2.483.5 GHz, and BT often operates at 2.402-2.480 GHz. Simultaneous operation of multiple radios co-located on the same physical device, therefore, can suffer significant degradation including significant in-device coexistence (IDC) interference between them because of the overlapping or adjacent radio spectrums. Due to physical proximity and radio power leakage, when the transmission of data for a first radio transceiver overlaps with the reception of data for a second radio transceiver in time domain, the second radio transceiver reception can suffer due to interference from the first radio transceiver transmission. Likewise, data transmission of the second radio transceiver can interfere with data reception of the first radio transceiver.

A new IDC indication message comprising two options is provided by LTE Rel.11 to avoid potential radio interference within the same device. Under FDM (Frequency Division Multiplexing) option, a user equipment (UE) reports interfered frequency and the network moves the UE away from the troubled frequency by handover. This option provides a quick approach with almost no performance impact at the expense of possible LTE spectrum waste. Under TDM (Time Division Multiplexing) option, a UE suggests LTE TX pattern to the network by DRX (Discontinuous Reception)-like gap, subframe bitmap gap. This option provides the best spectrum efficiency with full range LTE B40 and Wi-Fi 2.4 GHz operation but suffers performance impact on throughput due to time-sharing between radios. Internal coordination between LTE and Wi-Fi modules is also needed to determine LTE DRX pattern.

For LTE cellular data and Wi-Fi P2P technology coexistence scenario, the two systems execute by turns in DRX-based IDC solution. LTE data scheduling is described by a set of DRX parameters, while Wi-Fi P2P data scheduling is described by Opportunistic Power Saving (OppoPS) and Notification of Absence (NoA) parameters. Each of the parameters must be selected carefully to maximize efficiency. Without proper alignment, performance degradation due to Wi-Fi internal scheduling constraint will affect the system performance significantly.

SUMMARY

For LTE cellular data and Wi-Fi P2P technology coexistence scenario, a user equipment can generate in-device coexistence (IDC) indication message to the base station for DRX-based IDC solution. LTE data scheduling is described by a set of DRX parameters, while Wi-Fi P2P data scheduling is described by Opportunistic Power Saving (OppoPS) and Notification of Absence (NoA) parameters. When generating the IDC indication message for Wi-Fi P2P group client (GC), the DRX parameters must be selected carefully to maximize efficiency. The best DRX offset case brings 22%~63% more throughput than average for OppoPS scenarios and 50% more than average for NoA scenarios. Even though Wi-Fi shares less time, with proper time alignment, its coexistence performance could be better. For Wi-Fi P2P group owner (GO) with IDC TDM scheduling constraints, OppoPS and NoA should be aligned with DRX parameters to achieve best performance.

In one embodiment, a method of coordinating Wi-Fi P2P and LTE data traffic from a Wi-Fi group client (GC) perspective is proposed. A UE obtains LTE DRX parameters from a base station. The UE is a Wi-Fi P2P group client (GC) equipped with an LTE radio transceiver and a collocated Wi-Fi radio transceiver. The UE obtains Wi-Fi scheduling parameters from a Wi-Fi P2P group owner (GO). The Wi-Fi scheduling parameters comprise at least one of client traffic window information and absent time information of the GO. The UE determines desired DRX parameters based on the Wi-Fi scheduling parameters. The UE transmits an IDC indicator with the desired DRX parameters to the base station.

In another embodiment, a method of coordinating Wi-Fi P2P and LTE data traffic from a Wi-Fi group owner (GO) perspective is proposed. A UE obtains LTE DRX parameters from a base station. The UE is a Wi-Fi P2P group owner (GO) equipped with an LTE radio transceiver and a collocated Wi-Fi radio transceiver. The UE determines desired DRX parameters and transmits an IDC indicator to the base station. The UE generates Wi-Fi scheduling parameters to be aligned with the DRX parameters or the desired DRX parameters if adopted by the base station. The Wi-Fi scheduling parameters comprise at least one of client traffic window information and absent time information of the GO. The GO transmits the Wi-Fi scheduling parameters to a Wi-Fi P2P group client (GC).

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
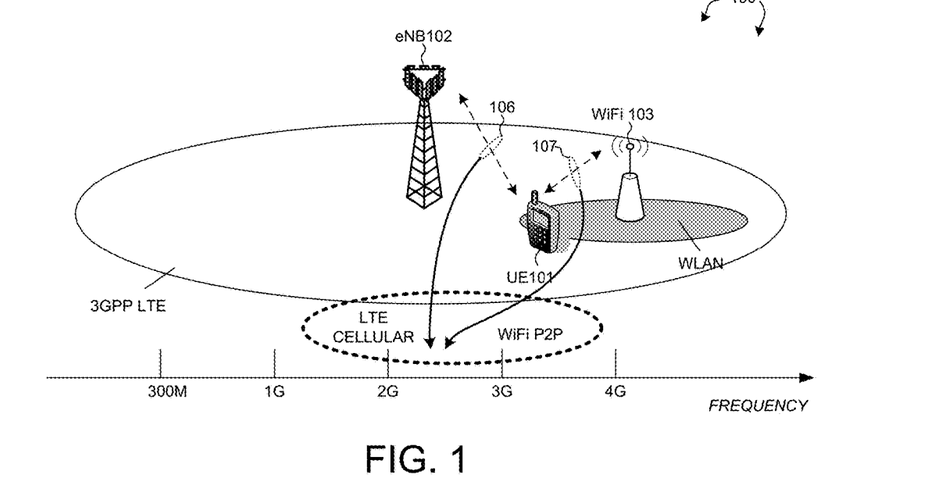
FIG. 1 illustrates a user equipment having multiple radio transceivers for Wi-Fi P2P and LTE coordination in a wireless communication system in accordance with one novel aspect.

FIG. 1 illustrates a user equipment having multiple radio transceivers in a wireless communication system 100 in accordance with one novel aspect. Wireless communication system 100 comprises a user equipment UE 101, a serving base station (e.g., evolved node-B) eNB 102, and a Wi-Fi device Wi-Fi 103. Wireless communication system 100 provides various network access services for UE 101 via different radio access technologies. For example, eNB 102 provides cellular radio network (e.g., a 3GPP Long-Term Evolution (LTE) or LTE-Advanced (LTE-A) system) access, and Wi-Fi 103 is an access point (AP) that provides local coverage in Wireless Local Area Network (WLAN) access. To better facilitate the various radio access technologies, UE 101 is a multi-radio terminal (MRT) that is equipped with multiple radio modules co-located in the same device platform (i.e., in-device).

Due to scarce radio spectrum resource, different radio access technologies may operate in overlapping or adjacent radio spectrums. As illustrated in FIG. 1, UE 101 communicates radio signal 106 with eNB 102, and radio signal 107 with Wi-Fi device 103. Radio signal 106 belongs to 3GPP Band 40, and radio signal 107 belongs to one of the Wi-Fi channels. The frequencies of all those radio signals fall within a range from 2.3 GHz to 2.5 GHz, which may result in significant coexistence interference with each other. In one novel aspect, UE 101 coordinates with different radio transceivers within the same device platform to mitigate in-device coexistence (IDC) interference. For Wi-Fi P2P technology, a Wi-Fi group owner (GO) communicates with a Wi-Fi group client (GC). In one embodiment, UE 101 is a Wi-Fi group client (GC) while Wi-Fi 103 is a Wi-Fi group owner (GO). In another embodiment, UE 101 is a GO while Wi-Fi 103 is a GC.

There are different IDC solutions to mitigate the IDC interference. Under FDM (Frequency Division Multiplexing)-based solution, a UE reports interfered frequency and the network moves the UE away from the troubled frequency by handover. FDM-based IDC solution provides a quick approach with almost no performance impact at the expense of possible LTE spectrum waste. Under TDM (Time Division Multiplexing)-based solution, a UE suggests LTE TX pattern to the network by DRX (Discontinuous Reception)-like gap, subframe bitmap gap. TDM-based IDC solution provides the best spectrum efficiency with full range LTE B40 and Wi-Fi 2.4 GHz operation but suffers performance impact on throughput due to time-sharing between radios.

For LTE cellular and Wi-Fi P2P coexistence, DRX-based solution can be adopted for IDC interference mitigation. LTE data scheduling is described by DRX parameters, while Wi-Fi P2P data scheduling is described by Opportunistic Power Saving (OppoPS) and Notification of Absence (NoA) parameters. Each of the parameters must be selected carefully to maximize efficiency. In accordance with one novel aspect, a UE (either a GO or a GC) determines the best combination of scheduling parameters and controls IDC indication message generation to mitigate potential throughput impact on UE to maintain UE performance as much as possible.

Figure 2:
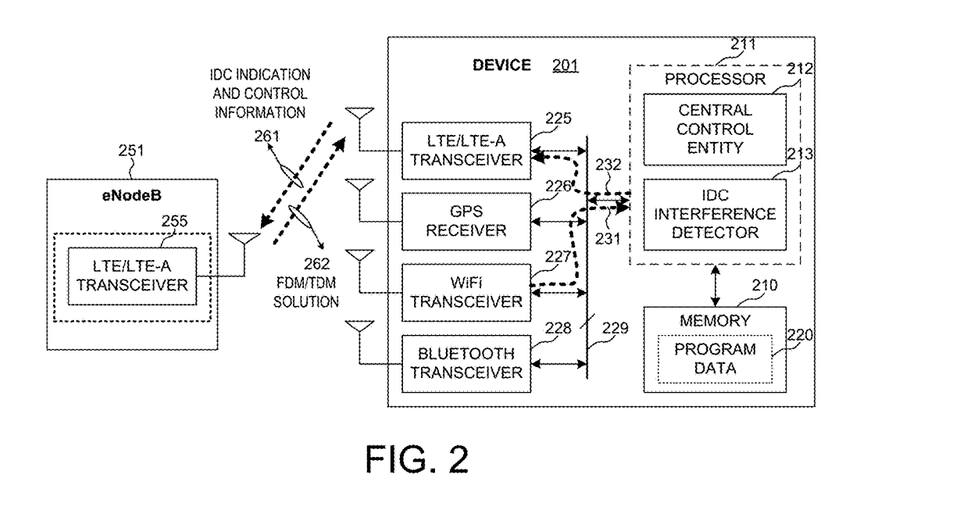
FIG. 2 illustrates one embodiment of a simplified block diagram of an LTE user equipment having a central control entity and IDC indication.

FIG. 2 illustrates one embodiment of a simplified block diagram of a wireless communication device 201 having a central control entity that carries out embodiments of the present invention. Wireless communication device 201 comprises memory 210 containing program and data 220, a processor 211 having a central control entity 212 and an IDC interference detector 213, a LTE/LTE-A transceiver 225, a GPS receiver 226, a WiFi transceiver 227, a Bluetooth transceiver 228, and bus 229. In the example of FIG. 2, central control entity 212 is a logical entity physically implemented within processor 211, which is also used for device application processing for device 201. Central control entity 212 is connected to various transceivers within device 201, and communicates with the various transceivers via bus 229. For example, WiFi transceiver 227 transmits Wi-Fi signal information and/or Wi-Fi traffic and scheduling information to central control entity 212 (e.g., depicted by a thick dotted line 231). Based on the received Wi-Fi information, central control entity 212 determines control information and transmits the control information to LTE/LTE-A transceiver 225 (e.g., depicted by a thick dotted line 232).

In one embodiment, LTE transceiver 225 further communicates with its serving base station eNB 251, transmitting IDC indication message 261 and in response receiving IDC mitigation solution 262 to mitigate IDC interference. Note that in another embodiment, the central control entity 212 can be a logical entity physically implemented within a processor that is physically located within LTE/LTE-A transceiver 225. Alternatively, central control entity 212 may physically be located within the Wi-Fi transceiver or within the Bluetooth transceiver. Central control entity 212 is coupled to various radio transceivers co-located within device 201 and communicates with the various local control entities via bus 229. The central control entity and IDC interference detector are circuits that can be configured and implemented by software, firmware, hardware, or any combination thereof. The circuits, when executed by the processors 211 (e.g., via executing program code 220), for example, allows UE 201 to detect IDC interference, generate and report IDC indication message, and receive IDC solution from eNB 251 to mitigate IDC interference.

How to effectively mitigate coexistence interference is a challenging problem for co-located radio transceivers operating in overlapping or adjacent frequency channels. When an LTE transceiver is co-located with a Wi-Fi transceiver, the transmitting (TX) signal by the Wi-Fi transceiver is very close to the receiving (RX) signal for the LTE transceiver in frequency domain. As a result, the out of band (OOB) emission and spurious emission by the Wi-Fi transceiver is unacceptable to the LTE transceiver resulted by imperfect TX filter and RF design. For example, the WiFi/BT TX signal power level may be still higher (e.g. 60 dB higher before filtering) than the LTE RX signal power level even after the filtering (e.g., after 50 dB suppression) without additional interference avoidance mechanism.

In LTE systems, most activities are controlled by the network. Therefore, at the initiation of LTE network-controlled UE-assisted IDC interference mitigation solutions, the UE can send an indication to the network to report the problem resulted by coexistence interference, or to recommend a certain action to be performed. For example, when there is ongoing interference on the serving frequency, indication can be sent by the UE whenever it has problem in LTE downlink (DL) or ISM DL reception it cannot solve by itself, and the eNB has not taken action yet based on RRM measurements.

The basic principle of the TDM solution is to reduce time overlap between the Wi-Fi TX/RX and the LTE RX/TX to avoid coexistence interference. In a DRX-based TDM solution for IDC, a UE recommends DRX configuration parameters to its serving eNB. Similar to FDM solution, device coordination capability is required to support DRX based 3GPP TDM solution. For example, a control entity is used to derive the recommended DRX ON/OFF configuration to the eNB. The control entity receives information from co-located Wi-Fi transceivers including scheduling type (e.g. Wi-Fi OppoPS or NoA), traffic states (e.g. Tx or Rx) and characteristics (e.g. level of activity, traffic pattern), and priority demand, and determines the recommended DRX ON/OFF duration, DRX ON/OFF ratio, duty cycle, and starting time. In a DRX-based solution for LTE cellular and Wi-Fi P2P coexistence, the UE needs to determine the Wi-Fi scheduling parameters together with LTE DRX parameters such that the combination can fulfill the quality of service (QoS) requirement of the UE.

Figure 3:
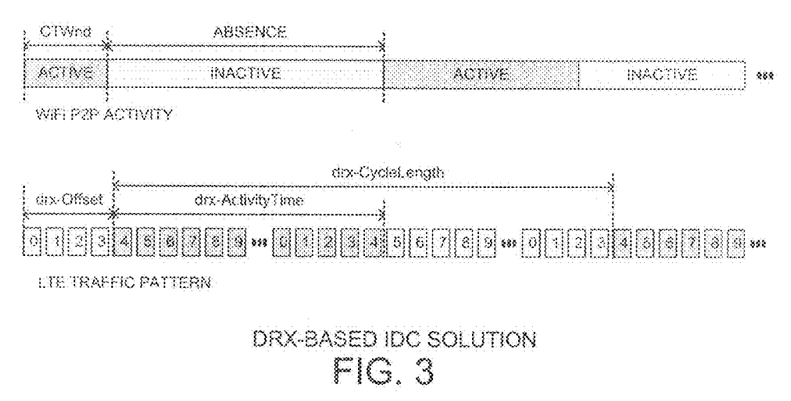
FIG. 3 illustrate examples of DRX-based solutions for IDC interference mitigation between Wi-Fi P2P and LTE cellular data.

FIG. 3 illustrate examples of DRX-based solutions for IDC interference mitigation between Wi-Fi P2P and LTE cellular data. In DRX-based solution, the LTE and Wi-Fi radio transceivers take turns to execute. LTE traffic pattern is scheduled based on DRX parameters including drx-Offset, drx-ActiveTime and drx-CycleLength. Wi-Fi P2P activity is scheduled based on opportunistic power saving (OppoPS) parameters (e.g., Client Traffic Window (CTWindow) duration) and/or notification of absence (NoA) parameters (e.g., Start time, Interval, Duration, and Count of absent duration). In general, for DRX-based solution to mitigate IDC interference, if the LTE radio is active, then the Wi-Fi radio is inactive. On the other hand, if the LTE radio is inactive, then the Wi-Fi radio is active. The LTE and Wi-Fi parameters must be coordinated to maximize efficiency. Without proper alignment, performance degradation due to Wi-Fi internal scheduling constraint will affect the system significantly.

Figure 4:
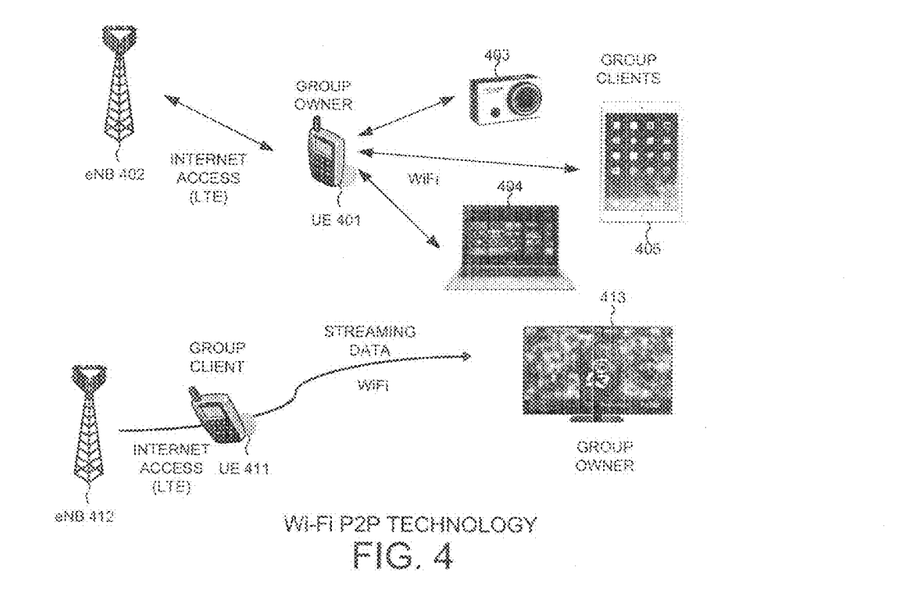
FIG. 4 illustrates examples of Wi-Fi P2P technology involving group owner and group client interacting with LTE cellular data.

FIG. 4 illustrates examples of Wi-Fi P2P technology involving group owner and group client interacting with LTE cellular data. As depicted in the top half of FIG. 4, UE 401 is a Wi-Fi group owner (GO) device that is equipped with LTE cellular radio and Wi-Fi radio in the same device platform. UE 401 can access the internet via LTE cellular data. Meanwhile, UE 401 is also a Wi-Fi GO acting an AP-like role, which provides services to a plurality of group clients 403, 404, 405 (e.g., notebook, tablets, etc.) via Wi-Fi. As depicted in the bottom half of FIG. 4, UE 411 is a Wi-Fi group client (GC) device that is equipped with LTE cellular radio and Wi-Fi radio in the same device platform. UE 411 can access the internet via LTE cellular data. Meanwhile, UE 411 is also a Wi-Fi GC (e.g., a Miracast Source), which provides streaming data to group owner 413 (e.g., Miracast Sink) for video, audio, photos, and gaming.

Figure 5:
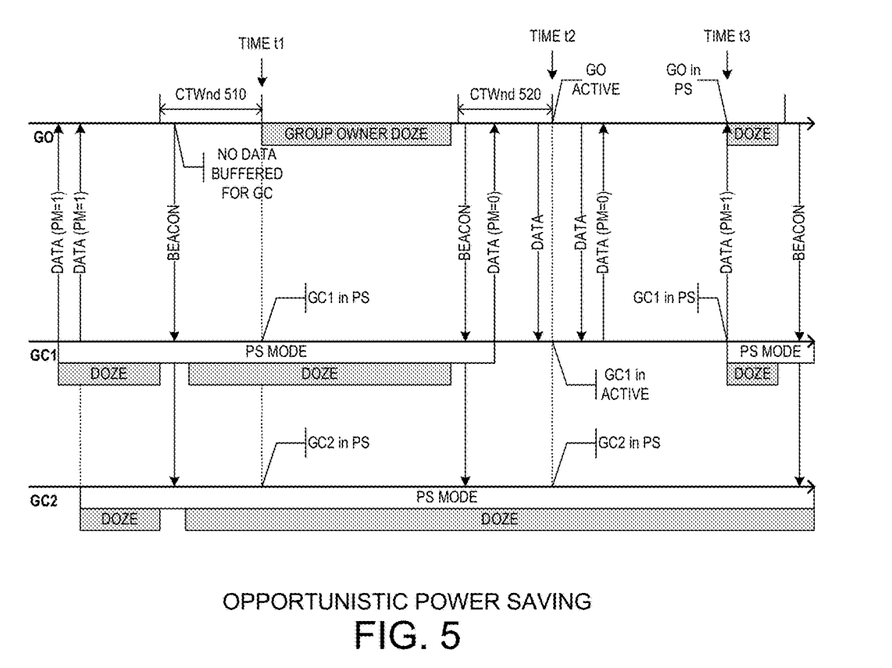
FIG. 5 illustrates an embodiment of opportunistic power saving of Wi-Fi P2P technology.

FIG. 5 illustrates an embodiment of opportunistic power saving (OppoPS) of Wi-Fi P2P technology. For OppoPS, the P2P group owner must be present for an availability period called the Client Traffic Window (CTWindow). The CTWindow is an integer number of Time Unit (1 TU=1.024 ms) and is always less than the beacon interval (BI) (could be as short as 10 TU). In general, the GO must be present during each CTWindow, but can stay in doze mode if all the clients are in power saving mode (PM=1). In the example of FIG. 5, the GO has two group clients GC1 and GC2. At time t1, after the first CTWindow 510, both GC1 and GC2 are in power saving mode. As a result, the GO enters doze state. At time t2, after the second CTWindow 520, GC2 is still in power saving mode, while GC1 is in active mode. As a result, the GO stays in active state. Later on, at time t3, GC2 remains in power saving mode, and GC1 changes to power saving mode from active mode. As a result, the GO enters doze state again to save power.

Figure 6:
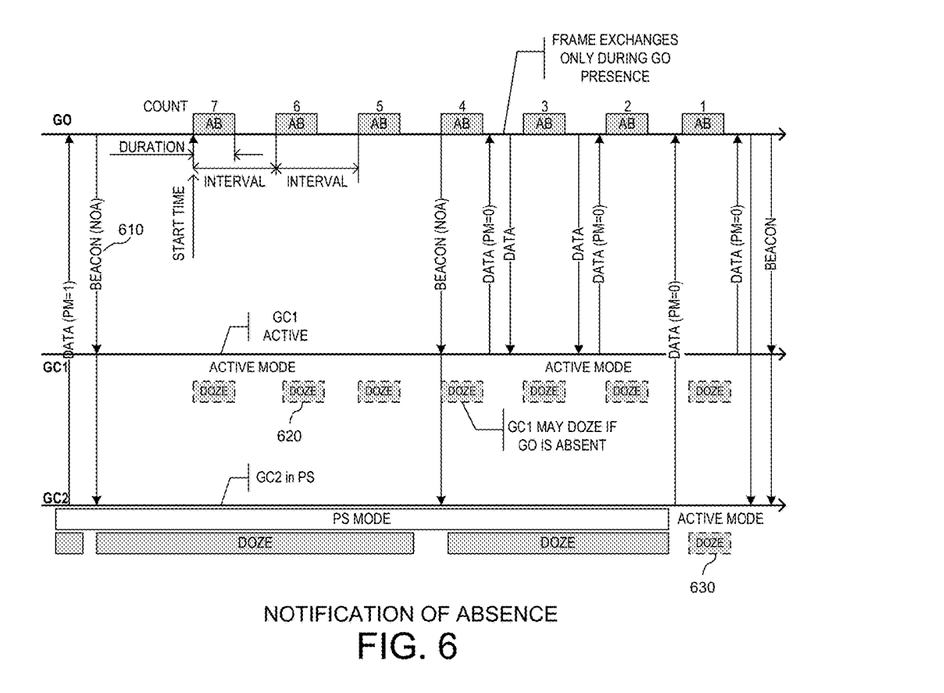
FIG. 6 illustrates an embodiment of notification of absence of Wi-Fi P2P technology.

FIG. 6 illustrates an embodiment of notification of absence (NoA) of Wi-Fi P2P technology. For NoA, the P2P group owner specifies a list of NoA parameters including the start time, interval, duration, and count defining when the GO is absent. The list of NoA parameters can be signaled to the clients in Beacon signal and Probe Response frames.

Furthermore, the clients can suggest the Duration and Interval fields by sending Presence Request to the GO. In the example of FIG. 6, the GO has two group clients GC1 and GC2. In Beacon signal 610, the GO informs GC1 and GC2 the list of NoA parameters, e.g., the start time of its absence, the duration of each absence, the interval between two absences, and the total counts (e.g., 7) of absences. Initially, GC1 stays in active mode while GC2 stays in power saving mode. As a result, the NoA does not have much impact on GC2. For GC1, however, it has the option to doze whenever the GO is absent (e.g., as depicted by box 620). Later, GC2 enters in active mode as well so GC2 has the option to doze whenever the GO is absent (e.g., as depicted by box 630).

Figure 7:
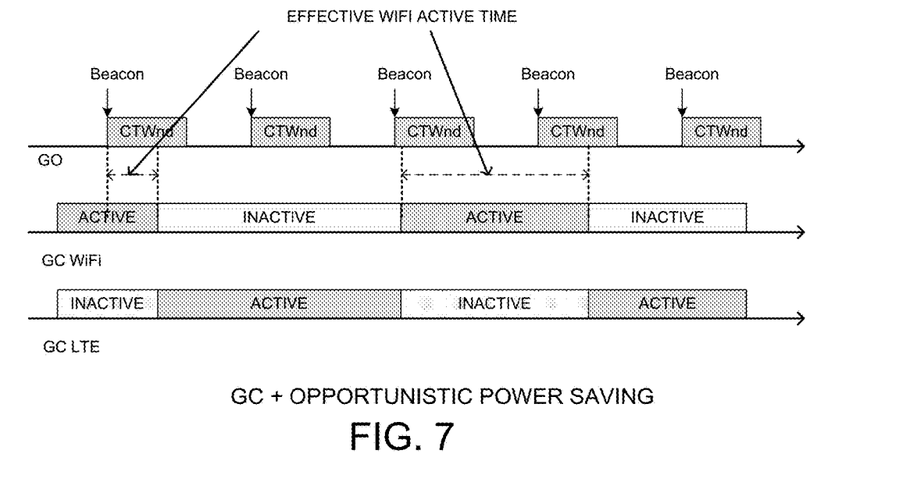
FIG. 7 illustrates a scenario between LTE cellular and Wi-Fi data from group client perspective involving opportunistic power saving.

FIG. 7 illustrates a scenario between LTE cellular and Wi-Fi data from group client perspective involving opportunistic power saving. In the example of FIG. 7, a group client GC is equipped with both an LTE cellular radio and a Wi-Fi radio. The GC is a Miracast source of streaming data to a group owner GO acting as a Miracast sink for video, audio, photos, gaming. Based on DRX parameters, the GC LTE radio has alternating active and inactive periods, which corresponds to alternating inactive and active periods for the GC Wi-Fi radio. When OppoPS scheduling is applied by the GO, then the effective Wi-Fi active time depends on the CTWindow duration and alignment with the DRX parameters. For example, if BI=100 TU, CTWnd=10 TU, drx-CycleLength=80/128 (ms), drx-ActiveTime=40/80 (ms), then the resulting effective Wi-Fi active time is 107.2/44.8~170/238.4 (ms) per second.

Figure 8:
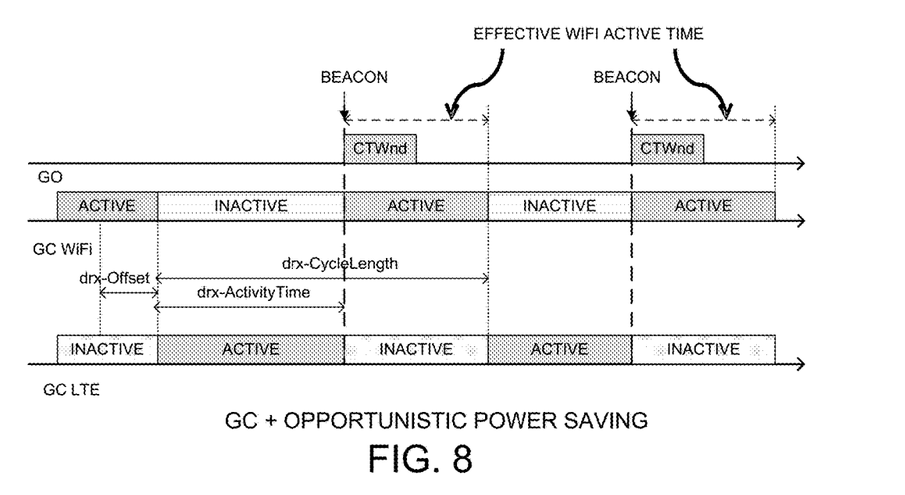
FIG. 8 illustrates a solution of coordination between LTE cellular and Wi-Fi data from group client perspective involving opportunistic power saving.

FIG. 8 illustrates a solution of coordination between LTE cellular and Wi-Fi data from group client perspective involving opportunistic power saving. As depicted in FIG. 8, to improve performance, the IDC DRX parameters are selected such that the total amount of active time for GC Wi-Fi radio overlapping with CTWnd is maximized. The best DRX offset case brings 22%~63% more throughput than average in the example of FIG. 7. Even though the GC Wi-Fi radio has less active time, with proper alignment with the GO CTWnd, the coexistence performance could still be better.

Figure 9:
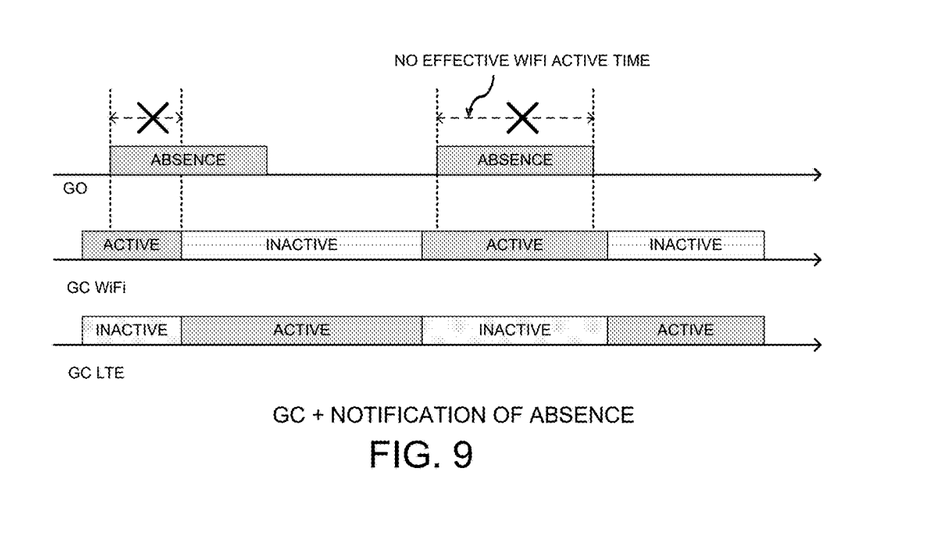
FIG. 9 illustrates a scenario between LTE cellular and Wi-Fi data from group client perspective involving notification of absence.

FIG. 9 illustrates a scenario between LTE cellular and Wi-Fi data from group client perspective involving notification of absence. In the example of FIG. 9, a group client GC is equipped with both an LTE cellular radio and a Wi-Fi radio. The GC is a Miracast source of streaming data to a group owner GO acting as a Miracast sink for video, audio, photos, gaming. Based on DRX parameters, the GC LTE radio has alternating active and inactive periods, which corresponds to alternating inactive and active periods for the GC Wi-Fi radio. When NoA scheduling is applied by the GO, assume that the GO is working at 50% duty cycle, then the GC Wi-Fi radio also shares 50% time with the collocated LTE radio, the impact on Wi-Fi bandwidth is 50% less in average. By careful scheduling, performance impact due to proper time alignment can be minimized. For example, if the active time of the GC Wi-Fi radio is overlapped with the absent time of the GO, then those overlapped durations are not effective Wi-Fi active time.

Figure 10:
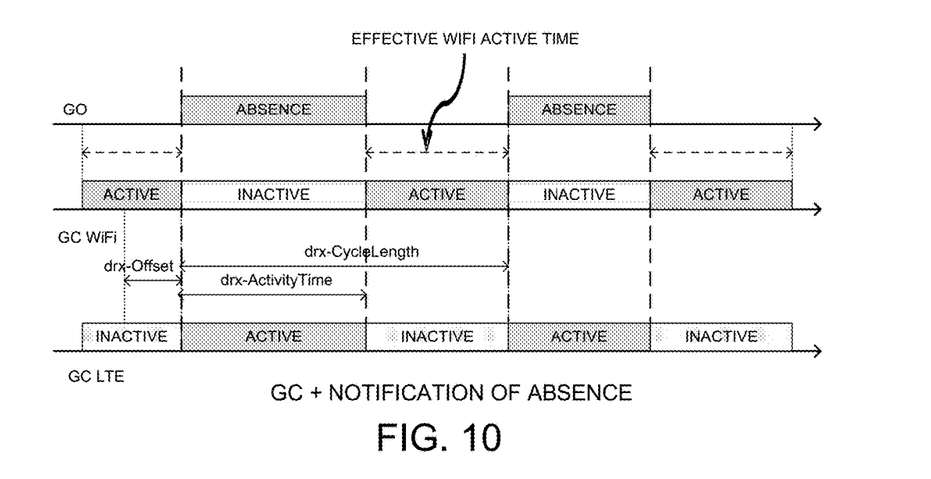
FIG. 10 illustrates a solution of coordination between LTE cellular and Wi-Fi data from group client perspective involving notification of absence.

FIG. 10 illustrates a solution of coordination between LTE cellular and Wi-Fi data from group client perspective involving notification of absence. As depicted in FIG. 10, to improve performance, the absent time of the GO overlaps with the inactive time of the GC Wi-Fi radio as much as possible. Preferably, drx-Offset is aligned with the start of the GO absent duration, drx-CycleLength is equal to the GO absent interval, and drx-ActiveTime is equal to the GO absent duration. Otherwise, the GC can iterate different valid drx-CycleLength, drx-ActiveTime, and drx-Offset options to determine one combination that fulfills QoS requirement.

Figure 11:
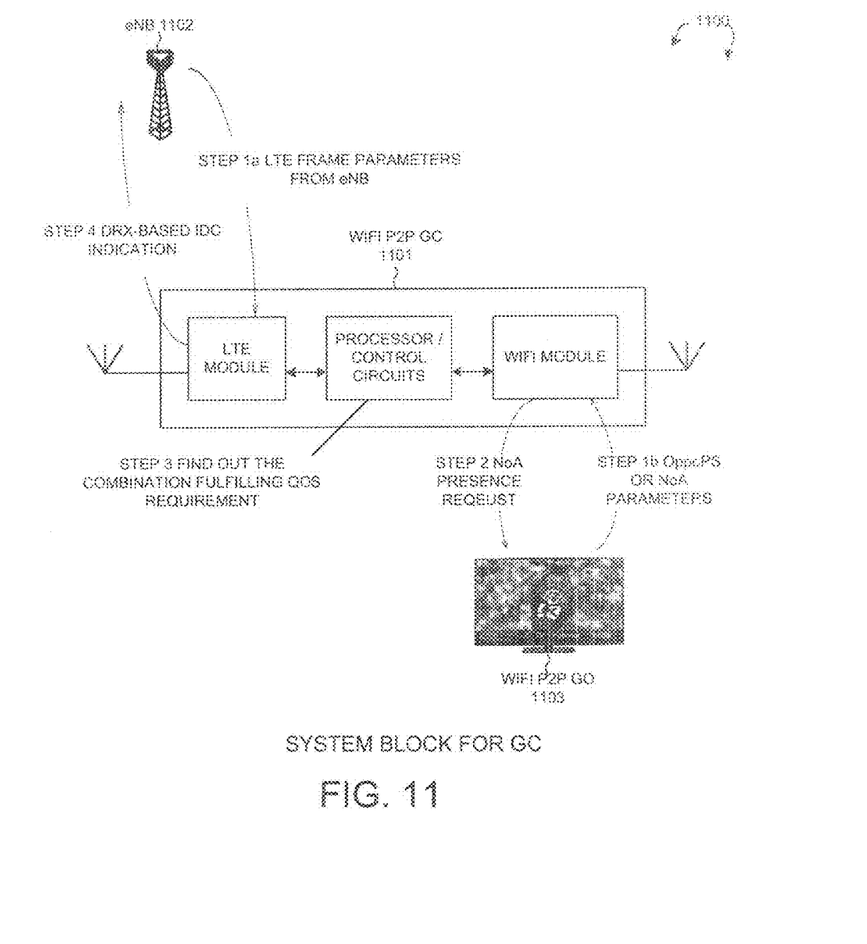
FIG. 11 illustrates a simplified block diagram of a group client for IDC interference mitigation between LTE and Wi-Fi in accordance with one novel aspect.

FIG. 11 illustrates a simplified block diagram of a group client for data traffic coordination between LTE and Wi-Fi in accordance with one novel aspect. Wireless communication network 1100 comprise a Wi-Fi P2P GC 1101, a base station eNB 1102, and a Wi-Fi P2P GO 1103. GC 1101 comprises an LTE radio module, a Wi-Fi radio module, and a processor/control circuit for IDC interference mitigation. In step 1a, the LTE module obtains LTE frame parameters from eNB 1102. In step 1b, the Wi-Fi module obtains OppoPS or NoA parameters from GO 1103. In step 2, GC 1101 optionally sends NoA presence request with suggested NoA parameters to GO 1103. In step 3, the processor finds out one DRX parameter combination that improves Wi-Fi performance and fulfills QoS requirement. In step 4, the LTE module sends out DRX-based IDC indication to eNB 1102. The IDC indication contains the desired DRX parameter combination.

Figure 12:
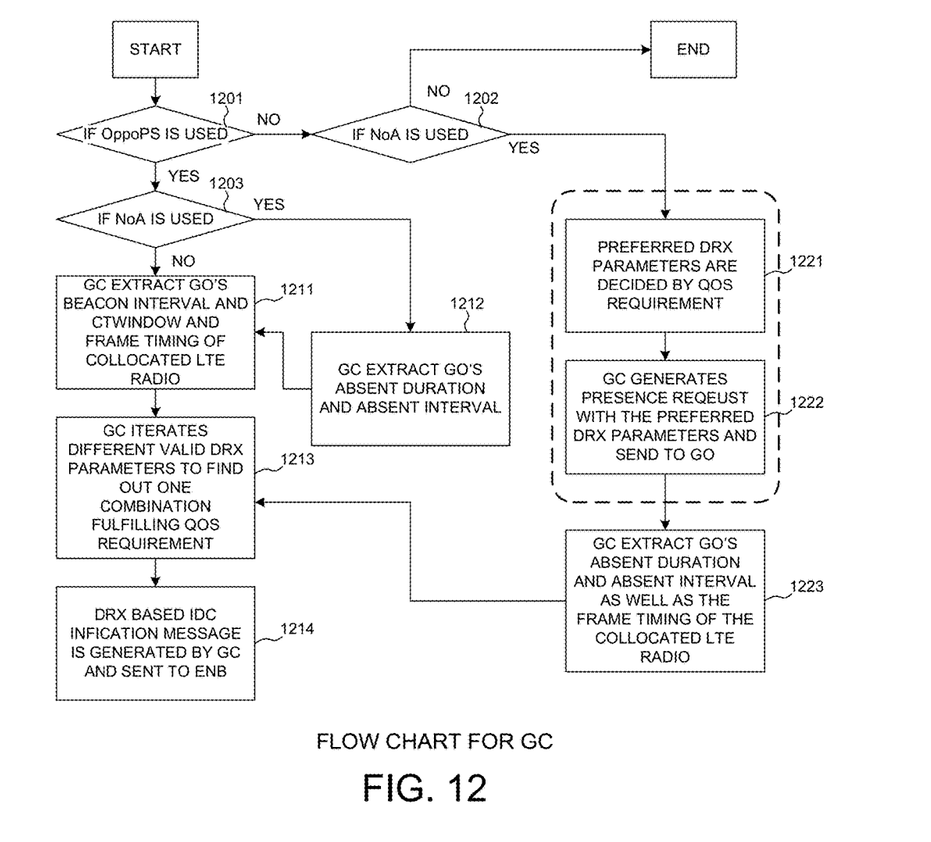
FIG. 12 is a flow chart of a group client for IDC interference mitigation between LTE and Wi-Fi in accordance with one novel aspect.

FIG. 12 is a flow chart of a group client for data traffic coordination between LTE and Wi-Fi in accordance with one novel aspect. The GC is equipped with both an LTE cellular radio communicating with a base station and a Wi-Fi radio communicating with a Wi-Fi GO. The GC checks whether OppoPS is used in step 1201. If the answer to step 1201 is no, then the GC checks whether NoA is used in step 1202. If the answer to step 1202 is no, then the GC does not need to do anything. If the answer to step 1202 is yes, then the GC goes to step 1221 and decides preferred DRX parameters to fulfill QoS requirement. The GC then goes to step 1222 and generates Presence Request with the preferred DRX parameters and send to GO. Steps 1221 and 1222 are optional. If those steps are not performed, then the GC goes from step 1202 to step 1223 directly, during which the GC extracts the absent duration and absent interval of the GO, as well as the frame timing of the collocated LTE radio.

If the answer to step 1201 is yes, then the GC checks whether NoA is used in step 1203. If the answer to step 1203 is no, then the GC extracts the beacon interval and the CTWindow of the GO, as well as the frame timing of the collocated LTE radio in step 1211. If the answer to step 1203 is yes, then the GC extracts the absent duration and the absent interval of the GO in step 1212 and then goes to step 1211. After step 1211 or step 1223, the GC goes to step 1213, during which the GC iterates different valid DRX parameter options to find out one combination that fulfills QoS requirement. Finally, in step 1214, the GC generates DRX-based IDC indication message and sends to the base station.

Figure 13:
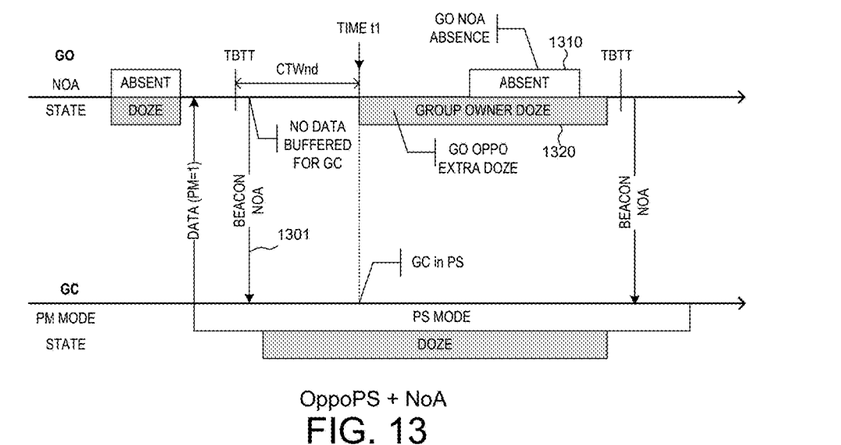
FIG. 13 illustrates an embodiment of combining opportunistic power saving with notification of absence of Wi-Fi P2P technology.

FIG. 13 illustrates an embodiment of combining opportunistic power saving with notification of absence of Wi-Fi P2P technology. In the example of FIG. 13, a group owner GO acts as an AP-like role and provides service to its group clients GC such as notebooks and tablets. The GO uses NoA scheduling combined with OppoPS scheduling. Under OppoPS, during the CTWindow time, the GO sends a beacon signal 1301 with NoA parameters defining its absent time to its GC. For example, the GO is absent as depicted by box 1310. In addition, at time t1, after the CTWindow, the GO detects that all the GC are in power saving (sleep) mode and therefore the GO enters doze state as depicted by box 1320. As a result, the opportunistic power saving may be combined with absence of notification for additional doze time for the GO.

Figure 14:
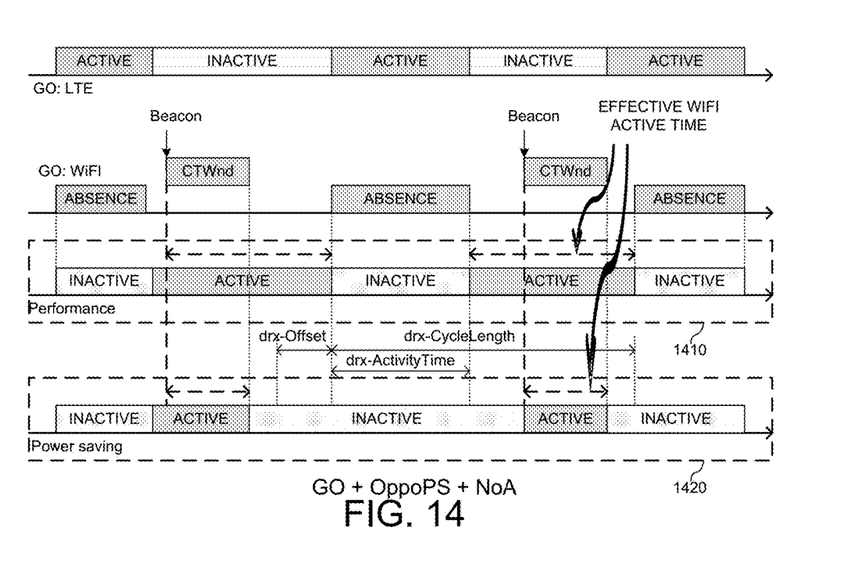
FIG. 14 illustrates a solution of coordination between LTE cellular and Wi-Fi data from group owner perspective.

FIG. 14 illustrates a solution of coordination between LTE cellular and Wi-Fi data from group owner perspective. In general, a GO uses NoA to achieve the best performance while preventing IDC interference problems. Furthermore, the GO uses OppoPS to save power when all clients are in power saving (sleep) mode. In the example of FIG. 14, a group owner GO is equipped with both an LTE cellular radio and a Wi-Fi radio. Under NoA, to improve performance and to increase the effective Wi-Fi active time, the absent time of the GO overlaps with the active time of the GO LTE radio as much as possible, as depicted by box 1410. Preferably, drx-Offset is aligned with the start of the GO absent duration, drx-CycleLength is equal to the GO absent interval, and drx-ActiveTime is equal to the GO absent duration. Furthermore, to achieve more power saving, the GO can use OppoPS and enter doze state and have longer inactive time if all clients are in sleep mode, as depicted by box 1420.

Figure 15:
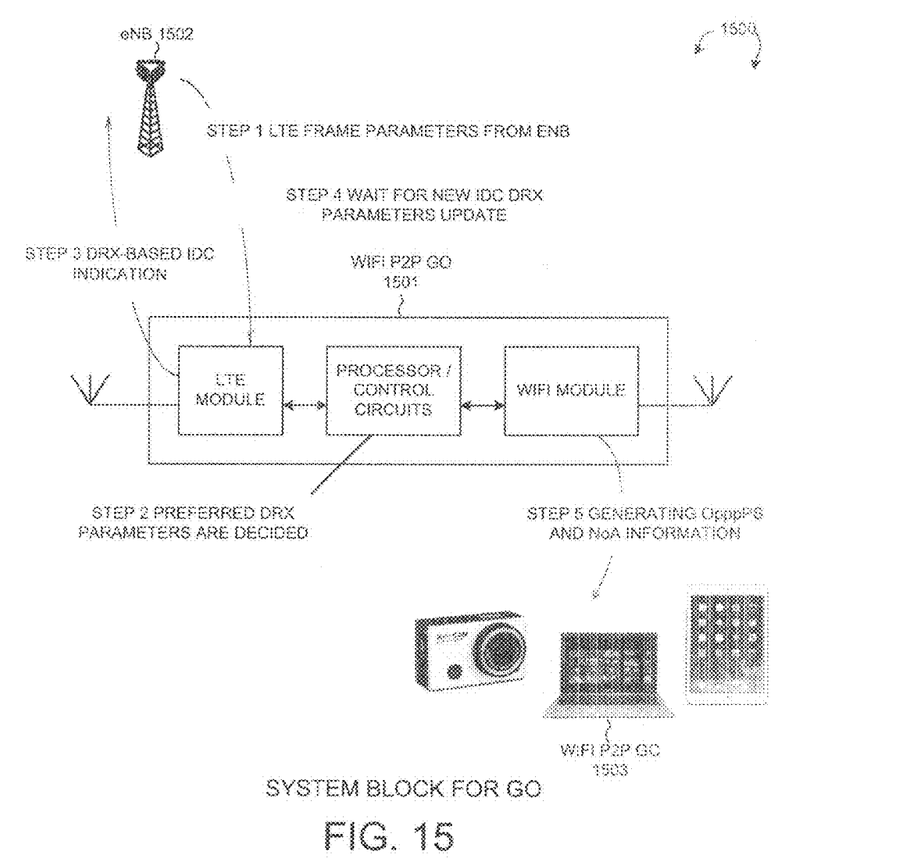
FIG. 15 illustrates a simplified block diagram of a group owner for IDC interference mitigation between LTE and Wi-Fi in accordance with one novel aspect.

FIG. 15 illustrates a simplified block diagram of a group owner for data traffic coordination between LTE and Wi-Fi in accordance with one novel aspect. Wireless communication network 1500 comprise a Wi-Fi P2P GO 1501, a base station eNB 1502, and a Wi-Fi P2P GC 1503. GO 1501 comprises an LTE radio module, a Wi-Fi radio module, and a processor/control circuit for IDC interference mitigation. In step 1, the LTE module obtains LTE frame parameters from eNB 1502. In step 2, the processor finds out preferred DRX parameter combination that improves Wi-Fi performance and fulfills QoS requirement. In step 3, the LTE module sends out DRX-based IDC indication to eNB 1502. The IDC indication contains the preferred DRX parameter combination. In step 4, the LTE module waits for new IDC message for DRX parameter update (optional). The base station may or may not send such update. In step 5, the Wi-Fi module generates OppoPS and/or NoA parameters to inform GC 1503. The OppoPS and/or NoA parameters aligns with the LTE DRX parameters, or aligns with the preferred DRX parameters if adopted by the base station to achieve performance and power saving.

Figure 16:
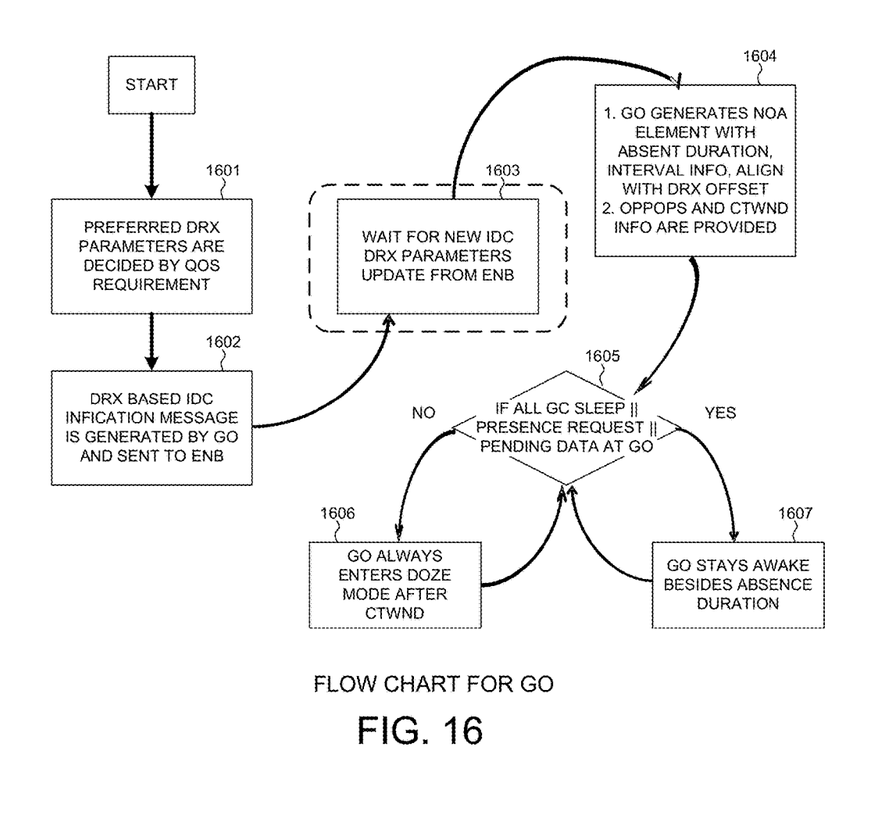
FIG. 16 is a flow chart of a group owner for IDC interference mitigation between LTE and Wi-Fi in accordance with one novel aspect.

FIG. 16 is a flow chart of a group owner for data traffic coordination between LTE and Wi-Fi in accordance with one novel aspect. The GO is equipped with both an LTE cellular radio communicating with a base station and a Wi-Fi radio communicating with a Wi-Fi GC. In step 1601, the GO decides preferred DRX parameters based on QoS requirement. In step 1602, the GO sends DRX-based IDC message to the base station. In step 1603, the GO waits for new IDC DRX parameters from the base station. In step 1604, the GO generates NoA elements with Absent Duration, Absent Interval information, and aligns with drx-Offset to maximize GO performance and sends to the GC. In addition, the GO provides CTWindow information for OppoPS scheduling to the GC. In step 1605, the GO checks if any GC is in active mode or if any GC has sent Presence Request or if there is any pending data at the GO. If the answer is no, then the GO always enters doze mode after CTWindow. If the answer is yes, then the GO stays awake besides the absence duration.

Figure 17:
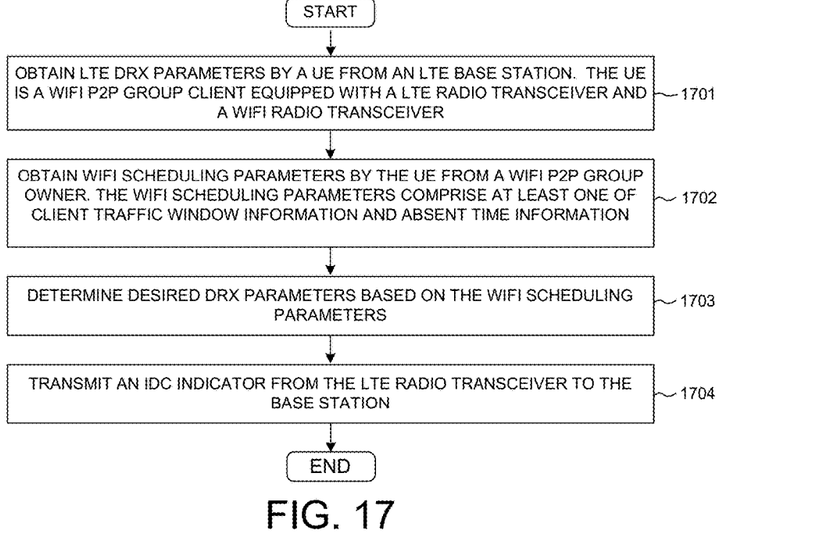
FIG. 17 is a flow chart of a method of coordinating Wi-Fi P2P and LTE data traffic from a Wi-Fi group client (GC) perspective in accordance with one novel aspect.

FIG. 17 is a flow chart of a method of coordinating Wi-Fi P2P and LTE data traffic from a Wi-Fi group client (GC) perspective in accordance with one novel aspect. In step 1701, a UE obtains LTE DRX parameters from a base station. The UE is a Wi-Fi P2P group client (GC) equipped with an LTE radio transceiver and a collocated Wi-Fi radio transceiver. In step 1702, the UE obtains Wi-Fi scheduling parameters from a Wi-Fi P2P group owner (GO). The Wi-Fi scheduling parameters comprise at least one of client traffic window information and absent time information of the GO. In step 1703, the UE determines desired DRX parameters based on the Wi-Fi scheduling parameters. In step 1704, the UE transmits an IDC indicator to the base station.

Figure 18:
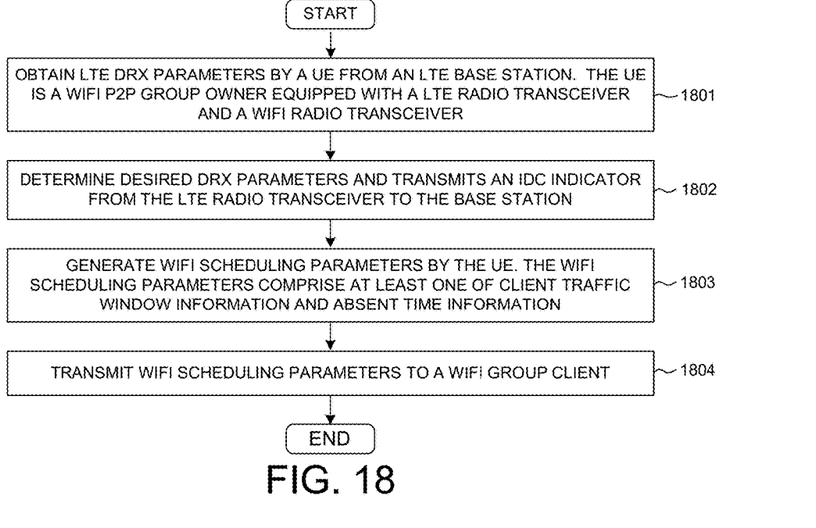
FIG. 18 is a flow chart of a method of coordinating Wi-Fi P2P and LTE data traffic from a Wi-Fi group owner (GO) perspective in accordance with one novel aspect.

FIG. 18 is a flow chart of a method of coordinating Wi-Fi P2P and LTE data traffic from a Wi-Fi group owner (GO) perspective in accordance with one novel aspect. In step 1801, a UE obtains LTE DRX parameters from a base station. The UE is a Wi-Fi P2P group owner (GO) equipped with an LTE radio transceiver and a collocated Wi-Fi radio transceiver. In step 1802, the UE determines desired DRX parameters and transmits an IDC indicator to the base station. In step 1803, the UE generates Wi-Fi scheduling parameters to be aligned with the DRX parameters or the desired DRX parameters if adopted by the base station. The Wi-Fi scheduling parameters comprise at least one of client traffic window information and absent time information of the GO. In step 1804, the GO transmits the Wi-Fi scheduling parameters to a Wi-Fi P2P group client (GC).

Although the present invention has been described in connection with certain specific embodiments for instructional purposes, the present invention is not limited thereto. For example, although an LTE-advanced mobile communication system is exemplified to describe the present invention, the present invention can be similarly applied to other mobile communication systems, such as Time Division Synchronous Code Division Multiple Access (TD-SCDMA) systems. Accordingly, various modifications, adaptations, and combinations of various features of the described embodiments can be practiced without departing from the scope of the invention as set forth in the claims.

What is claimed is:

1. A method, comprising:
   obtaining LTE discontinuous reception (DRX) parameters by a user equipment (UE) from an LTE base station in a wireless communication network, wherein the UE is a Wi-Fi group client (GC) equipped with an LTE radio transceiver and a co-located Wi-Fi radio transceiver;
   obtaining Wi-Fi scheduling parameters by the UE from a Wi-Fi group owner (GO), wherein the Wi-Fi scheduling parameters comprise at least one of client traffic window information and absent time information of the GO;
   determining desired DRX parameters based on the Wi-Fi scheduling parameters; and
   transmitting an in-device coexistence (IDC) indicator containing the desired DRX parameters from the LTE radio transceiver to the base station.

2. The method of claim 1, wherein the DRX parameters reflect LTE active time and LTE inactive time of the LTE radio transceiver, which correspond to GC inactive time and GC active time of the Wi-Fi transceiver.

3. The method of claim 2, wherein the desired DRX parameters are determined to increase an effective Wi-Fi active time of the Wi-Fi transceiver.

4. The method of claim 2, wherein an opportunistic power saving scheme is adopted by the GO, and wherein the Wi-Fi scheduling parameters comprise a beacon interval and a client traffic window duration.

5. The method of claim 4, wherein the desired DRX parameters are determined such that the GC active time overlaps with the GO client traffic window duration.

6. The method of claim 2, wherein a notification of absence scheme is adopted by the GO, and wherein the Wi-Fi scheduling parameters comprise a start time, an interval, a duration, and a count of GO absence.

7. The method of claim 6, wherein the desired DRX parameters are determined such that the GC inactive time overlaps with the GO absent duration.

8. A user equipment (UE), comprising:
   an LTE radio transceiver that obtains LTE discontinuous reception (DRX) parameters from an LTE base station in a wireless communication network;

a Wi-Fi radio transceiver that obtains Wi-Fi scheduling parameters from a Wi-Fi group owner (GO), wherein the UE is a Wi-Fi group client (GC) equipped with the LTE radio transceiver and the co-located Wi-Fi radio transceiver, and wherein the Wi-Fi scheduling parameters comprise at least one of client traffic window information and absent time information of the GO;

a control circuit that determines desired DRX parameters based on the Wi-Fi scheduling parameters; and a transmitter that transmits an in-device coexistence (IDC) indicator containing the desired DRX parameters from the LTE radio transceiver to the base station.

9. The UE of claim 8, wherein the DRX parameters reflect LTE active time and LTE inactive time of the LTE radio transceiver, which correspond to GC inactive time and GC active time of the Wi-Fi transceiver.

10. The UE of claim 9, wherein the desired DRX parameters are determined to increase an effective Wi-Fi active time of the Wi-Fi transceiver.

11. The UE of claim 9, wherein an opportunistic power saving scheme is adopted by the GO, and wherein the Wi-Fi scheduling parameters comprise a beacon interval and a client traffic window duration.

12. The UE of claim 11, wherein the desired DRX parameters are determined such that the GC active time overlap with the GO client traffic window duration.

13. The UE of claim 9, wherein a notification of absence scheme is adopted by the GO, and wherein the Wi-Fi scheduling parameters comprise a start time, an interval, a duration, and a count of GO absence.

14. The UE of claim 13, wherein the desired DRX parameters are determined such that the GC inactive time overlap with the GO absent duration.

15. A method comprising:

obtaining LTE discontinuous reception (DRX) parameters by a user equipment (UE) from an LTE base station in a wireless communication network, wherein the UE is a Wi-Fi group owner (GO) equipped with an LTE radio transceiver and a co-located Wi-Fi radio transceiver;

determining desired DRX parameters and transmitting an in-device coexistence (IDC) indicator from the LTE radio transceiver to the base station;

generating Wi-Fi scheduling parameters by the UE, wherein the Wi-Fi scheduling parameters comprise at least one of client traffic window information and absent time information of the GO; and transmitting the Wi-Fi scheduling parameters to a Wi-Fi group client (GC).

16. The method of claim 15, wherein the DRX parameters reflect LTE active time and LTE inactive time of the LTE radio transceiver, which correspond to GO inactive time and GO active time of the Wi-Fi transceiver.

17. The method of claim 16, wherein the desired DRX parameters are determined to increase an effective Wi-Fi active time of the Wi-Fi transceiver.

18. The method of claim 16, wherein an opportunistic power saving scheme is adopted by the GO, and wherein the Wi-Fi scheduling parameters comprise a beacon interval and a client traffic window duration.

19. The method of claim 18, wherein the GO client traffic window duration aligns with the GO active time.

20. The method of claim 16, wherein a notification of absence scheme is adopted by the GO, and wherein the Wi-Fi scheduling parameters comprise a start time, an interval, a duration, and a count of GO absence.

21. The method of claim 20, wherein the GO absent duration aligns with the GC inactive time.

22. The method of claim 15, wherein the GO applies a notification of absence scheme as well as an opportunistic power saving scheme.

* * * * *